April 4, 1961

R. C. RUMBLE 2,978,688

DISPLACEMENT INDICATING APPARATUS

Filed Oct. 7, 1957

INVENTOR.
ROBERT C. RUMBLE,

BY John B. Davidson

ATTORNEY.

United States Patent Office 2,978,688
Patented Apr. 4, 1961

2,978,688

DISPLACEMENT INDICATING APPARATUS

Robert C. Rumble, Harris County, Tex., assignor, by mesne assignments, to Jersey Production Research Company, Tulsa, Okla., a corporation of Delaware Filed Oct. 7, 1957, Ser. No. 688,718

7 Claims. (Cl. 340—203)

This invention relates to devices for measuring a variable physical characteristic, such as pressure or temperature, and more particularly, to such devices for use where it is necessary to make measurements at an inaccessible location, such as within a borehole in the earth.

Many devices have been devised for measuring a physical characteristic, such as temperature or pressure, in a remote, inaccessible location, such as a borehole. Normally, it is necessary not only to make the measurment, but also to transmit the results of the measurement over a considerable distance. The measurement is often manifested in terms of the varying longitudinal extension of a rod, shaft, or other elongated physical members. In the past it has been the usual practice to utilize devices such as strain gauges, slide wire rheostats, selsyn motors with racks and pinions, movable metal slugs in impedance bridges, and oscillators that change frequency when a component such as a crystal or a capacitor is deformed. Generally speaking, these devices have been found to introduce electrical or mechanical complication, or the measurements made therewith have been found to suffer from lack of precision or stability.

Additionally, it is often desirable to minimize the number of electrical conductors required to energize the measuring apparatus and to transmit electrical signals produced by the measuring apparatus to a remote location. This is a particularly important consideration when the measuring apparatus is to be lowered into a borehole in the earth.

Accordingly, it is one object of this invention to provide a simple, rugged apparatus for measuring a physical characteristic, such as pressure or temperature, and for transmitting the results of the measurement to a remote location.

Another object is to provide apparatus for measuring a physical characteristic and for transmitting the results of the measurement to a remote location wherein there is utilized a minimum number of electrical conductors.

Still another object is to provide improved apparatus for making measurements of physical characteristics that is particularly adapted for making measurements of a borehole in the earth.

Yet another object is to provide apparatus for measuring a physical characteristic that is adapted for rough handling and which is capable of making extremely precise, reliable measurements.

Other objects and features of the invention will become apparent upon consideration of the following description when taken in conjunction with the accompanying drawings, wherein.

In accordance with the teachings of the invention, the physical quantity undergoing measurement is expressed in terms of the linear excursion of a device utilized as a switch actuating means. A switch carrier, or scanner, movable in parallel relationship to the switch actuating means and adapted to be actuated thereby, is driven between first and second limits of movement by a reversible motor means. In more particular, the switch carrier may be connected to a finely threaded shaft through a finely threaded bore therein, the threaded shaft being driven by the reversible motor either directly or through a reduction gear. For the purpose of reciprocally driving the switch carrier back and forth between one extremity of movement thereof and the switch actuating means, there is provided limit switches on the switch carrier and the said one extremity of movement connected in circuit relationship so that the electric motor will reverse itself upon actuation of the limit switch on the switch carrier by the switch actuating means, or upon actuation of the limit switch at said extremity of movement between switch carrier. Means are further provided which are actuated by the motor means for determining the distance traversed by the switch carrier between reversals in direction of rotation of the motor means. In a preferred embodiment of the invention, pulses are produced on the electrical lead supplying power to the motor means that are proportional in number to the number of revolutions of the motor during the interval between actuation of the limit switch at the extremity of movement and the limit switch on the switch carrier.

Figure 1:
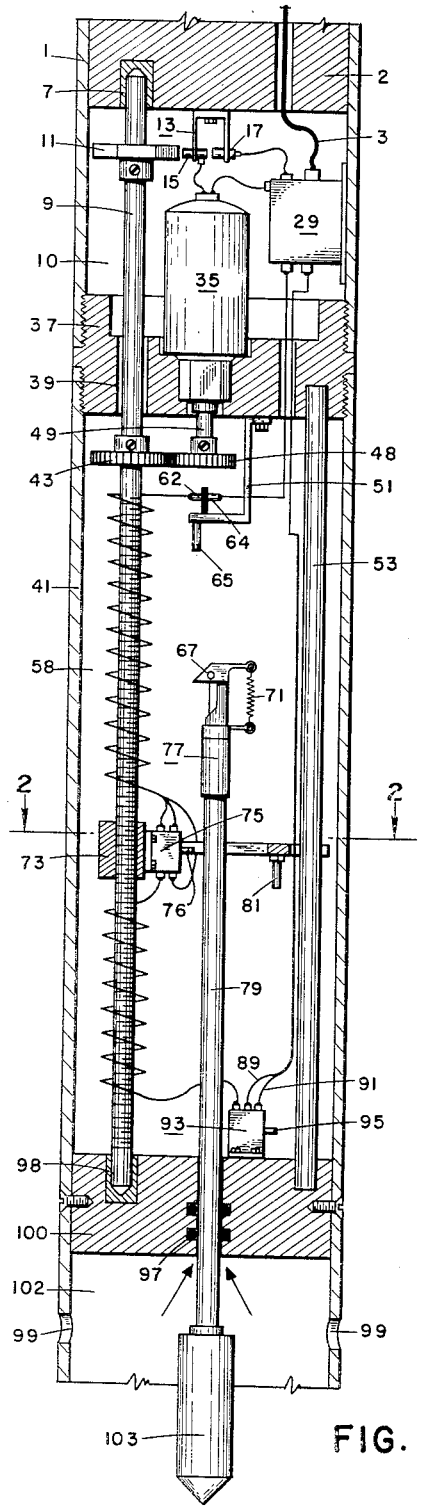
Fig. 1 is a side elevational view, partially in cross-section, of one embodiment of the invention.

With reference now to Fig. 1, there is shown an instrument housing comprising a plurality of sections 1, 37, and 41, which may be generally cylindrical in form. The instrument housing, or barrel, encloses at least three chambers 10, 58, and 102. Fluid external to the housing is admitted to chamber 102 through two or more ports 99 to actuate a physical characteristic indicating device, here shown as a presure indicating device. It is to be understood that other physical characteristics may be measured without departing from the spirit of the invention, such as temperature. The actuating means responsive to the physical characteristic should produce a linear excursion of means within chamber 58 proportional to the magnitude of the physical characteristic being measured. To this end, as shown in the drawing, differential fluid pressure across lower wall member 100 produces a linear movement of switch actuating means 67 proportional to the magnitude of the pressure within chamber 102. A weight or spring, here shown as weight 103, is utilized to counterbalance the pressure within chamber 102 so that the movement of piston rod 79 is a function of the variation of pressure within chamber 102. Fluid seals, such as O-rings 97, are utilized to provide a positive fluid seal between chambers 58 and 102 and still permit relatively unimpeded movement of piston rod 79 with a minimum of opposition due to friction. Switch actuator 77 includes a pivoted member 67 and a compression spring 71 for purposes which will become apparent from the following description. Switch actuator 77 is affixed to the upper end of piston rod 79.

Middle wall member 37, which may form a part of the instrument housing, supports an electric motor 35 and provides a bearing for guide shaft 53 and switch carrier drive shaft 9. The lower end of guide shaft 53 is affixed to lower wall member 100. One function of switch carrier drive shaft 9 is to drive a switch carrier 73 vertically along a path substantially parallel to the path traversed by switch actuator 77 in response to pressure variations in chamber 102. Drive shaft 9 is provided with very fine threads for the portion of its length within chamber 58.

Switch carrier 73 has a bore within which there are matching threads. The threads may be standard threads, and may be 50 in number per inch of length of the drive shaft. Switch carrier 73 supports switch 75, the function of which will become apparent below.

Figure 2:
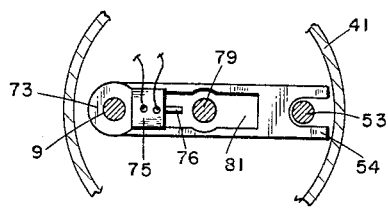
Fig. 2 is a top view of a portion of the apparatus shown in Fig. 1 for the purpose of more completely illustrating one of the components of the apparatus in Fig. 1.

As shown most perspicuously in Fig. 2, switch carrier 73 is provided with a clevis 54 that fits around guide shaft 53 to prevent rotation of the switch carrier as drive shaft 9 revolves, so that switch carrier 73 will move upwardly or downwardly in accordance with the direction of rotation of drive shaft 9. The switch carrier also has an internal cutout 81 adapted to accommodate piston rod 79 and switch actuator 77. Hinged section 67 of switch acutator 77 is positioned so that as switch carrier 75 moves upwardly, hinged section 67 will strike the actuating arm 76 of switch 75 to actuate the switch. At the end of switch carrier 75 adjacent guide shaft 53 is a switch actuating arm 81 adapted to strike the actuating arm 95 of a limit switch 93 positioned at the lower extremity of movement of switch carrier 73.

Drive shaft 9 is supported at its upper end by bearing recess 7 in top wall member 2 and at its lower end by bearing recess 98 in bottom wall member 100. Intermediate its ends, drive shaft 9 extends through a bore 39 in middle wall member 37. Shaft 9 may be driven directly from the output shaft of motor 35, but it is advisable to utilize reduction gearing to drive shaft 9. The reduction gearing is shown as gear 48 connected to the output shaft 49 of motor 35, and gear 43 connected to drive shaft 9 immediately below middle wall member 37. Motor 35 is preferably a direct current motor, although an alternating current may be used under certain circumstances. Main relay 29, which is connected to limit switches 75 and 93 and to motor 35 in a circuit which will be described below with reference to Fig. 3, may be affixed to housing section 1, or if desired, to the top or middle wall members.

For the purpose of insuring that limit switch 75 will be actuated at or near the upper extremity of its movement should switch actuator 77 fail to strike actuating arm 76 for some reason, there is provided an additional limit switch actuator 65 affixed to the underside of middle wall member 37 by bracket 51. A parallel connected condenser 62 and resistor 64 may be supported by bracket 51. The function of the condenser and resistor will be brought out below.

An electrical conductor 3 connected to relay 29 may be brought out of the instrument housing through top wall member 2 if desired. This conductor is adapted to supply energy to motor 35 and to relay 29, and further to conduct signals produced by a cam and breaker assembly to a remote location.

The cam 11 referred to above is affixed to drive shaft 9 and is provided with a number of lands around its circumference so as to repetitively close contacts 15 and 17 of switch mechanism 13. Switch 13 includes a spring arm biasing contact 15 against the lands of the cam. As the cam rotates, contact 15 is repetitively driven to the right, as shown, to engage contact 17.

Figure 3:
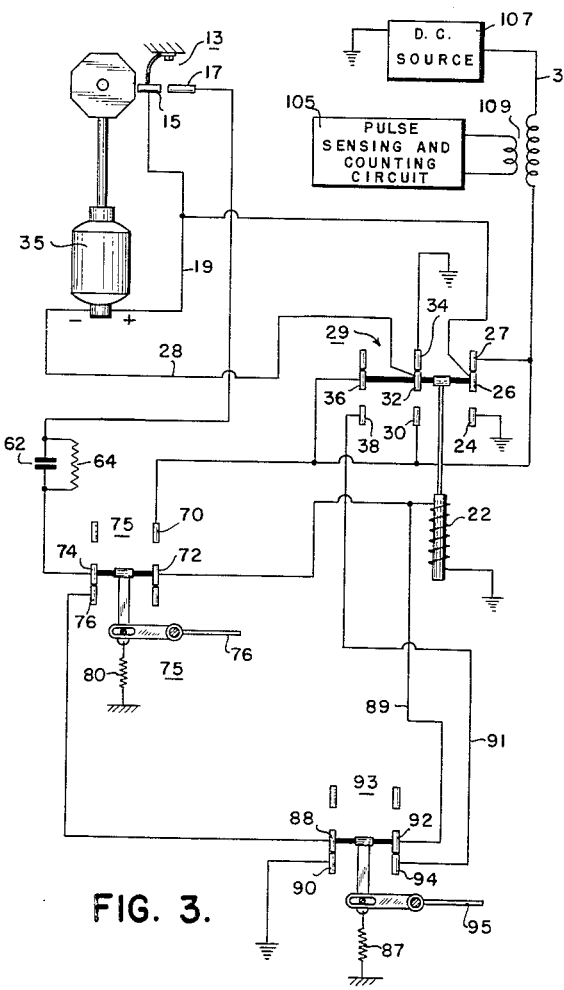
Fig. 3 is an electrical schematic diagram of the apparatus more perspicuously illustrating the electrical connections between various components of the apparatus in Fig. 1.

The electrical circuitry connecting switches 15, 75, and 93, motor 35, capacitor 62, resistor 64, and relay 29 is shown in Fig. 3. The circuitry will be best understood by describing a cycle of operation thereof.

Switches 75 and 93, and relay 29 are shown in their non-actuated positions. When D.-C. source 107 (which may be at the earth's surface) is activated to energize conductor 3, the windings of motor 35 will be energized from source 107 through conductor 3, contacts 27 and 26, lead 19, lead 28, contacts 32 and 34, and ground. Rotation of motor 35 and cam 11 will close contacts 15 and 17. With each closure of the contacts, condenser 62 will charge. Resistor 64 will substantially discharge condenser 62 before the next contact closure so that a pulse will appear on line 3 with each contact closure. The pulses are coupled to a pulse sensing and counting circuit 105 by transformer 109. When switch actuator 67 strikes actuating lever 76 of switch 75, contacts 74 and 76 will open, and shortly thereafter contacts 70 and 72 will close to energize winding 22 and actuate relay 29. Motor 35 will be energized from conductor 3 through contacts 32 and 30, leads 28 and 19, contacts 26 and 24 to ground. The polarity of the voltage applied to the motor windings will reverse so that the direction of rotation of the motor will reverse. Switch 75 will return to its non-actuated position, opening contacts 70, 72 and closing contacts 74, 76.

Note that relay 29 will remain in its actuated position inasmuch as a circuit has been completed from conductor 3 through contacts 36, 38, conductor 91, contacts 92 and 94 of switch 93, conductor 89, and through the relay winding 22 to ground. The relay will be held in its actuated position so that motor 35 will continue to drive switch carrier 73 downwardly. No pulses will appear on conductor 3 since contact 15 is grounded through contacts 26, 24, and contact 17 is coupled to ground through capacitor 62, resistor 64, and contacts 74, 76, 88, and 90.

As soon as switch actuating arm 81 of switch carrier 73 strikes actuating arm 95 of switch 93, contact 92 will be brought out of engagement with contact 94, de-energizing winding 22 so that the relay will drop to its initial position to reverse the direction of rotation of motor 35. Switch carrier 73 will again be driven upwardly and pulses will again appear on line 3. The pulses produced in line 3 during each subsequent passage of switch carrier 73 between limit switch 95 and switch actuator 77 (i.e., between actuation of switch 93 and actuation of switch 75) will be indicative of the distance that piston rod 79 extends into chamber 58. The number of pulses per vertical pass of the switch actuating arm between actuation of the two switches can be made to be a very precise measure of the extension of the rod into the chamber by utilizing a very fine thread on shaft 9. The number of pulses is equal to the product of the vertical movement of the switch carrier in inches, the number of threads per inch on shaft 9, and the number of protuberances or flats on cam 11. The measurement of the pressure or other physical characteristic that determines the distance that rod 79 extends into chamber 58 is coincident with the arrival at pulse counting device 105 of the last pulse of a given sequence of pulses. This serves to provide an instantaneous determination of the physical characteristic at the remote location. The counting device 105 may be either manually or electronically reset between scanning intervals and, if desired, suitable recordation device may be connected thereto for recording the output indications thereof.

It is to be noted that the train of pulses will cease shortly before the direction of rotation of motor 35 is reversed upon actuation of switch 75. The reason for this is that contacts 74 and 76 separate an instant before closure of contacts 70 and 72.

When the supply voltage from source 107 is re-established after an interval of interruption, the motor will always, with but one exception, rotate in a direction that will cause the switch carrier 73 to move upwardly, and during this initial upward movement, pulses caused by closure of the contacts of switch 13 will appear on conductor 3, as described above. The one exception to this generalization occurs when the supply voltage is re-established with the switch carrier in such a position that contacts 70 and 72 of switch 75 are in engagement. Under this special circumstance, the relay 29 is immediately energized and locked in through contacts 92 and 94. The switch carrier will be moved downwardly and contacts 15 and 17 of switch 13 are grounded so that no pulses will appear on conductor 3 until contacts 92 and 94 separate to deactuate relay 29.

Note that the first pulses of a given series of pulses will not begin until contacts 88 and 90 are in engagement. This means that switch 93 must close almost as soon as the switch carrier 73 begins moving upwardly.

Therefore, switch actuating arm 81 should actuate switch 93 with only a very light pressure thereon.

Limit switches 75 and 93 may be of conventional design, such as are manufactured by the Westinghouse Electric Company for planar control systems, and the like. Springs 80 and 87 are shown as biasing the switches to their normal, non-actuated positions. Pulse sensing and counting circuit may be of the type manufactured by the Atomic Instrument Co., Cambridge, Massachusetts, called Industrial Glow Tube Counter. D.C. source 107 may be any type of direct current source known to the art. It is preferable that motor 35 utilize a permanent magnet field in order to minimize the number of conductors required for energization thereof.

If, for some reason, switch actuator 77 should not strike switch actuating arm 76 of limit switch 75, the switch carrier will continue moving upwardly. In this event, switch actuator 65 will strike the actuating arm at the upper limit of its movement so as to reverse the direction of rotation of the motor.

Manifestly, the objects specified above will be achieved by the invention. The invention will give a very strong signal without the use of vacuum tube or amplifier of any kind. The apparatus is adapted to operate with very low voltage on conductor 3, and the drive motor is always in the circuit so as to run either clockwise or counterclockwise. None of the components are particularly temperature-sensitive and are inherently stable in nature. It is rugged and can withstand a considerable amount of maltreatment and abuse without harmful results.

The invention is not to be restricted to the specific structural details, arrangement of parts, or circuit connections herein set forth, as various modifications thereof may be effected without departing from the spirit and scope of this invention.

What is claimed is:

1. Apparatus for measuring a physical quantity expressed in terms of the rectilinear excursion of a switch actuating means, including: a switch carrier movable in parallel relationship to said switch actuating means; reversible motor means coupled to said switch carrier and adapted to drive said switch carrier between first and second limits of movement thereof; direct current source means having one grounded connection, adapted to be connected to said reversible motor means for energization thereof; relay means having an actuating winding, said relay means, when not actuated, interconnecting said current source and said motor so that said motor will revolve in a direction to drive said switch carrier from said first limit of movement toward said switch actuating means; said relay means, when actuated, interconnecting said current source and said motor so that said motor will drive said switch carrier toward said switch actuating means; first limit switch means on said switch carrier positioned so as to be actuated by said switch actuating means when said switch carrier is in predetermined physical relationship with said switch actuating means, said first limit switch means being adapted on actuation by said switch actuating means to momentarily connect said current source to said actuating winding to actuate said relay; second limit switch means adapted to be actuated by said switch carrier at said first limit of movement thereof, said second limit switch means having first and second normally closed contacts adapted to open on actuation of said second limit switch means; an auxiliary contact on said relay adapted to close on actuation of said relay to couple said current source to said relay winding through said first normally closed contact of said second limit switch means; a normally closed auxiliary contact on said first limit switch means; pulse producing means driven by said motor means for drawing current pulses from said current source, said pulses having a repetition rate variable as a direct function of motor speed, said pulse producing means being adapted to produce pulses by momentarily connecting the terminal of said motor that is of positive potential when said relay is in its normal position to the ground connection of said current source means through said second terminal of said second limit switch means and said auxiliary terminal of said first limit switch means connected in series; and means electrically coupled to said current source for counting said current pulses.

2. Apparatus for measuring a physical quantity expressed in terms of the rectilinear excursion of a switch actuating means, including: a switch carrier movable in parallel relationship to said switch actuating means; reversible motor means driving a threaded shaft; a threaded bore in said switch carrier means for threadingly engaging said threaded shaft; means restraining said switch carrier against rotational movement so that rotation of said threaded shaft by said motor will drive said switch carrier between first and second limits of movement thereof; direct current source means having one grounded connection, adapted to be connected to said reversible motor means for energization thereof; relay means having an actuating winding, said relay means, when not actuated, being adapted to normally connect said current source to said motor so that said motor will revolve in a direction to drive said switch carrier from said first limit of movement toward said switch actuating means; said relay means, when actuated, connecting said current source to said motor so that said motor will revolve in the opposite direction to drive said switch carrier toward said switch actuating means; first limit switch means on said switch carrier, adapted to be actuated by said switch actuating means when said switch carrier is in predetermined physical relationship with said switch actuating means to momentarily connect said current source to said actuating winding to actuate said relay; second limit switch means adapted to be actuated by said switch carrier at said first limit of movement thereof, said second limit switch means having first and second normally closed contacts adapted to open on actuation of said second limit switch means; an auxiliary contact on said relay adapted to close on actuation of said relay to couple said current source to said relay winding through said first normally closed contact of said second limit switch means; a normally closed auxiliary contact on said first limit switch means; pulse producing means driven by said motor means for drawing current pulses from said direct current source means, said pulses having a repetition rate variable as a direct function of motor speed, said pulse producing means being adapted to produce pulses by momentarily connecting the terminal of said motor that is of positive potential when said relay is in its normal position to the ground connection of said current source means through said second terminal of said second limit switch means and said auxiliary terminal of said first limit switch means connected in series; and means electrically coupled to said source for counting said current pulses.

3. Apparatus for measuring the longitudinal extension of a longitudinally movable first shaft, comprising: a threaded second shaft having its longitudinal axis substantially parallel to said axis of said first shaft; electric motor means for driving said second shaft; scanner means screw-threadedly engaging said second shaft; a third shaft having its longitudinal axis substantially parallel to said first and second shafts, loosely engaging said scanner means to hold said scanner means against rotational movement with said second shaft so that rotation of said second shaft will move said scanner means longitudinally along said second shaft; stationary switch means positioned at one of the limits of longitudinal movement of said scanner means and electrically interconnected with said motor means, actuated by said scanner means for reversing the direction of rotation of said motor means; second switch means carried by said scanner means, electrically interconnected with said motor means adapted, when actuated, to reverse the direction of rotation of said motor means; means positioned between said limits of movement of said scanner means and affixed to said first shaft for actuating said second switch means to reverse direction of rotation of said motor and reverse direction of movement of said scanner means; and means actuated by said second shaft for counting the revolutions of the motor to determine the distance traversed by said scanner means between reversals in direction of movement thereof.

4. Apparatus for measuring the longitudinal extension of a longitudinally movable first shaft; comprising: a switch actuating means on said first shaft and movable therewith; a threaded second shaft having its longitudinal axis substantially parallel to said axis of said first shaft; reversible electric motor means for rotating said second shaft; scanner means driven by said second shaft by rotation of said second shaft and adapted to slide longitudinally along said first shaft; said reversible electric motor means being adapted to reciprocably drive said scanner along said second shaft between first and second extremities of movement; means including first and second limit switch means electrically interconnected with said motor for reversing the direction of rotation of said motor upon each actuation of a limit switch, said first limit switch means being actuable by said scanner means at said first extremity of movement thereof; said second limit switch being carried by said scanner means and actuable by said actuating means on said shaft when said actuating means and said scanner means are in predetermined physical relationship, and by second actuating means at said second extremity of movement of said scanner means; and means actuated by said second shaft for counting the revolutions of the motor to determine the distance traversed by said scanner means between reversals in direction of movement thereof.

5. Apparatus for measuring a physical quantity expressed in terms of the rectilinear movement of a first shaft, comprising: a switch actuating arm carried by said first shaft so that rectilinear movement thereof is indicative of said physical quantity; a switch carrier having a threaded bore, a threaded second shaft positioned in substantially parallel relationship to said first shaft threadedly engaging said threaded bore; reversible motor means connected to said threaded shaft for driving said threaded shaft; a third shaft in substantially parallel relationship in said threaded shaft, loosely engaging said switch carrier to prevent rotation of said switch carrier with said threaded shaft; a first electrical limit switch carried by said switch carrier; a second electrical limit switch positioned near one extremity of the range of movement of said switch carrier; at a remote location, an electrical source; electrical connecting means electrically interconnecting said electrical source, said motor, and said first and second limit switches so as to successively reverse the direction of rotation of said motor upon successive actuation of said first and second limit switches in alternation; switch actuating means on said switch carrier adapted to actuate said second electrical limit switch when said switch carrier is near said one extremity of the range of movement thereof; said switch actuating arm being positioned to actuate said first limit switch when said switch carrier is near said switch actuating arm; pulse producing means driven by said motor and electrically connected to said electrical connecting means to draw current pulses from said electrical source having a pulse repetition rate proportional to the rotational speed of said motor; and means electrically coupled to said electrical source for detecting and counting said pulses.

6. Apparatus for measuring a physical quantity expressed in terms of the rectilinear movement of a first shaft, comprising: a switch actuating arm carried by said first shaft so that rectilinear movement thereof is indicative of said physical quantity; a switch carrier having a threaded bore, a threaded second shaft positioned in substantially parallel relationship to said first shaft threadly engaging said threaded bore; reversible motor means connected to said threaded shaft for driving said threaded shaft; a third shaft in substantially parallel relationship to said threaded shaft, loosely engaging said switch carrier to prevent rotation of said switch carrier with said threaded shaft; a first electrical limit switch carried by said switch carrier; a second electrical limit switch positioned near one extremity of the range of movement of said switch carrier; at a remote location, an electrical source; electrical connecting means electrically interconnecting said electrical source, said motor, and said first and second limit switches so as to successively reverse the direction of rotation of said motor upon successive actuation of said first and second limit switches in alternation; switch actuating means on said switch carrier adapted to actuate said second electrical limit switch when said switch carrier is near said one extremity of the range of movement thereof; said switch actuating arm being positioned to actuate said first limit switch when said switch carrier is near said switch actuating arm; a cam driven by said motor; switch means actuated by said cam adapted to be periodically closed upon rotation of said motor and electrically connected to said electrical connecting means to draw a current pulse from said electrical source upon each closure thereof; and pulse detecting and counting means electrically coupled to said electrical source for detecting and counting said pulses.

7. Apparatus for measuring a physical quantity expressed in terms of the rectilinear movement of a first shaft, comprising: a switch actuating arm carried by said first shaft so that rectilinear movement thereof is indicative of said physical quantity; a switch carrier; a second shaft positioned in substantially parallel relationship to said first shaft and engaging said switch carrier to rectilinearly move said switch carrier parallel to the longitudinal axis of said first shaft by rotation of said second shaft; reversible motor means connected to said second shaft for driving said second shaft; a third shaft in substantially parallel relationship to said second shaft; loosely engaging said switch carrier to prevent rotation of said switch carrier with said second shaft; a first electrical limit switch carried by said switch carrier; a second electrical limit switch positioned near one extremity of the range of movement of said switch carrier; at a remote location, an electrical source; electrical connecting means electrically interconnecting said electrical source, said motor, and said first and second limit switches so as to successively reverse the direction of rotation of said motor upon successive actuation of said first and second limit switches in alternation; switch actuating means on said switch carrier adapted to actuate said second electrical limit switch when said switch carrier is near said one extremity of the range of movement thereof; said switch actuating arm being positioned to actuate said first limit switch when said switch carrier is near said switch actuating arm; pulse producing means driven by said motor and electrically connected to said electrical connecting means to draw current pulses from said electrical source having a pulse repetition rate proportional to the rotational speed of said motor; and means electrically coupled to said electrical source for detecting and counting said pulses.

References Cited in the file of this patent

UNITED STATES PATENTS

| | | |
|---|---|---|
| 1,955,043 | Yates et al. | Apr. 17, 1934 |
| 2,168,149 | Arnold | Aug. 1, 1939 |
| 2,197,636 | Faus | Apr. 16, 1940 |
| 2,554,171 | Brunot et al. | May 22, 1951 |
| 2,814,798 | Hosmer et al. | Nov. 26, 1957 |